United States Patent

Murdock

[11] Patent Number: 5,838,846
[45] Date of Patent: Nov. 17, 1998

[54] FIBER OPTIC SWITCH AND ATTENUATOR

[75] Inventor: John Kermit Murdock, Frisco, Tex.

[73] Assignee: McDonnell Douglas

[21] Appl. No.: 944,363

[22] Filed: Oct. 6, 1997

Related U.S. Application Data

[63] Continuation of Ser. No. 678,495, Jul. 9, 1996, abandoned.

[51] Int. Cl.$^6$ .................................................. G02B 6/26
[52] U.S. Cl. .................................. 385/16; 385/15; 385/123
[58] Field of Search .................................. 385/23, 65, 67, 385/15–20, 123

[56] References Cited

U.S. PATENT DOCUMENTS

| | | | |
|---|---|---|---|
| 4,057,719 | 11/1977 | Lewis | 385/18 X |
| 4,121,884 | 10/1978 | Greenwood | 350/96.15 |
| 4,245,886 | 1/1981 | Kolodzey | 350/96.2 |
| 4,384,761 | 5/1983 | Brady et al. | 350/96.2 |
| 4,505,539 | 3/1985 | Auracher | 350/96.15 |
| 4,615,580 | 10/1986 | Mayer | 350/96.2 |
| 5,101,449 | 3/1992 | Takeuchi | 385/3 |
| 5,311,410 | 5/1994 | Hsu | 362/10 |
| 5,434,756 | 7/1995 | Hsu | 362/32 |
| 5,438,638 | 8/1995 | Anderson | 385/20 |

*Primary Examiner*—Phan T. H. Palmer
*Attorney, Agent, or Firm*—Dale B. Halling

[57] ABSTRACT

A fiber optic switch and attenuator (10) has a sealed capsule (12). The sealed capsule (12) contains a first fluid (14), having a first index of refraction and having a first density. The sealed capsule (12) contains a second fluid (16), having a second index of refraction, the second index of refraction being greater than the first index of refraction. The second fluid (16) has a second density that is not equal to the first density. A bobbin (18) is contained in the sealed capsule (12). A fiber optic core (20) is wrapped around the bobbin (18). The fiber optic core (20) has a core index of refraction. The core index of refraction is less than the second index of refraction and greater than the first index of refraction. The fiber optic core (20) has a first end (22) and a second end (24) outside the sealed capsule (12).

18 Claims, 2 Drawing Sheets

5,838,846

FIBER OPTIC SWITCH AND ATTENUATOR

This is a continuation of application Ser. No. 08/678,495, filed Jul. 9, 1996 and now abandoned.

The Government has rights in this invention pursuant to Contract No. MDA972-94-3-0014 awarded by the Air Force.

FIELD OF THE INVENTION

The present invention relates generally to the field of fiber optics and more particularly to a fiber optic switch and attenuator.

BACKGROUND OF THE INVENTION

Fiber optic telecommunication lines are being installed worldwide to provide higher bandwidth and greater reliability than copper wire lines, microwave relay stations or satellites. One drawback with fiber optic communication systems is that the switches used to make and break connections are expensive and unreliable. One of the most common fiber optic switches, for both multimode and single mode fibers, rotates one optical fiber to multiple positions which butt up to other fibers for a 1 to n position switch configuration. Because this switch is mechanical it is slow, expensive to manufacture and any misalignments of the fibers results in additional losses and non-uniformities.

Another common switch only works with multimode optical fibers. It uses a moveable prism to align the input fiber optic signal with one of two output fiber optic cables. The prism switches are also expensive and have an even higher loss than the mechanical abutment switches.

A third type of fiber optic switch uses an absorbing or index matching fluid to change the coupling of the optical signal. Commonly a reservoir of the fluid is in communication with a capillary that bisects the fiber optic core. The fluid is pumped into the capillary by heating the fluid or applying pressure to the outside of the reservoir. These on-off switches are also expensive and less reliable because of their complexity.

Thus there exists a need for a fiber optic switch with good on-off performance that is inexpensive and reliable and does not require sustaining power.

SUMMARY OF THE INVENTION

A fiber optic switch that overcomes these limitations has a housing and an input attached to the housing. The input is connected to a first end of a selectable waveguide. The selectable waveguide has a first state and a second state. A second end of the selectable waveguide is connected to an output.

DETAILED DESCRIPTION OF THE DRAWINGS

Figure 1:
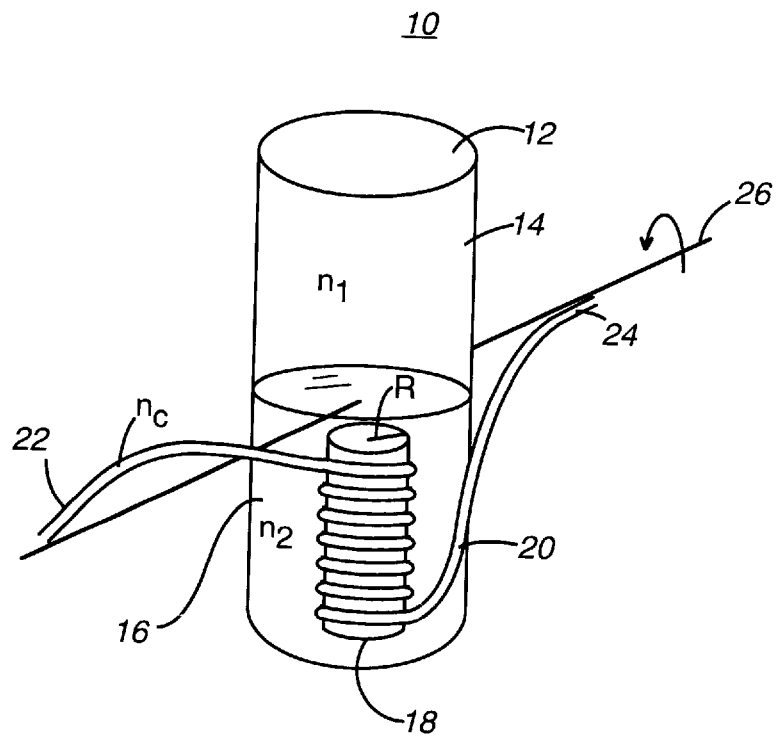
FIG. 1 is an embodiment of a fiber optic switch according to the invention.

Fiber optic cables use the principle of total internal reflection to guide light down the cable. The center or core of a fiber optic cable has a first index of refraction. The exterior (Cladding, coating) of the cable is usually doped to have a decreasing index of refraction (graded index) as you move toward the surface of the cable. As a result the light in the core of the cable is bent back into the core as it meets (at shallow angles) the exterior, doped section, of the cable. The fiber optic switch 10 of FIG. 1 takes advantage of this principle. The switch 10 has a housing (capsule, sealed capsule) 12 containing a first fluid (first medium, cladding) 14 having a first index of refraction and a second fluid (second medium, cladding) 16 having a second index of refraction. The first index of refraction is not equal to the second index of refraction. A mandrel (bobbin) 18 has a fiber optic core (core, waveguide core) 20 wrapped in a spiral around it. The fiber optic core 20 is wrapped around the core so that its windings do not touch each other at any point. An input 22 and an output 24 of the fiber optic core 20 extend outside the housing 12 through a seal. The fiber optic core 20 has a core index of refraction (predetermined index of refraction). In one embodiment, the core index of refraction is greater than the first index of refraction and less (or equal to) than the second index of refraction.

When the switch 10 is in a first state, the mandrel 18 and the core 20 are covered by the first medium 14, the switch 10 is on and transmits substantially all the light from the input 22 to the output 24. In the first state the first medium 14 performs the same function as the coating or exterior (cladding) of a fiber optic cable. As a result the light is internally reflected when it encounters the boundary between the core 20 and the first medium 14. When the switch 10 is in a second state, the mandrel 18 and core 20 are covered by the second medium 16, the switch 10 is off and the input light does not reach the output 24. In the second state the second medium 16 has a higher index of refraction than the first medium 14 and the light is not internally reflected when it encounters the boundary between the core 20 and the second medium 16. As a result the input light leaks out of the fiber optic core 20 and is not transmitted to the output 24. The switch 10 is moved from the first state to the second state by rotating the switch 10 so that the mandrel 18 is either at the bottom of the housing 12 or at the top of the housing 12 with respect to gravity. The mandrel 18 is fixed to the housing 12. The housing 12 is rotated by a shaft (means of transferring) 26. Other means for rotating the housing will be obvious to those skilled in the art and are considered part of the invention, as defined by the claims appended at the end of the patent.

In the preferred embodiment the first medium 14 has a first density that is different than a second density associated with the second medium 16. In addition, the first medium 14 is not soluble in the second medium 16 and the second medium 16 is not soluble in the first medium 14. As a result the one medium 14, 16 will float on top of the other medium 14, 16 and the two mediums will not mix. The invention contemplates a wide variety of liquids and gases that perform the function of the first medium and the second medium. One of the many possible examples uses air as the first medium and tung oil as the second medium.

A selectable waveguide comprises the core 20, the first medium 14 and the second medium 16. The selectable waveguide has a first state, that performs similarly to a standard waveguide with an exterior index of refraction that is lower than the core index of refraction. In the first state substantially all the input light is transmitted to the output 24. In a second state the selectable waveguide does not act as a waveguide and the input light leaks out of the core.

Figure 2:
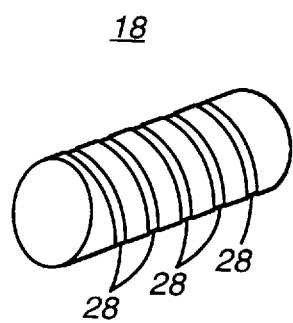
FIG. 2 is an embodiment of a mandrel.

FIG. 2 shows an optically opaque mandrel 18 with a groove (threads) 28 spiraling along the length of the mandrel 18. In one embodiment the core 20 sits in the groove 28. The groove 28 also prevents the light that escapes one winding of the core 20 from reentering the core 20 at another winding. Other modifications to the mandrel 18 to prevent cross talk will be obvious to those skilled in the art and are consider part of the invention, as defined by the claims.

Figure 3:
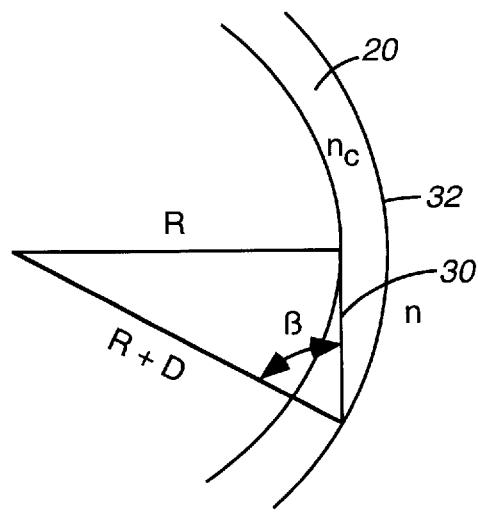
FIG. 3 is a schematic diagram of a fiber optic core.

FIG. 3 shows a fiber optic core 20 bent in a continuous arc of radius R. The radius of the mandrel is generally selected after the fiber optic core 20 material has been selected based on the wavelength of light being switched. In addition, the two fluids 14, 16 are selected to be non-soluble in each other, have different densities and the appropriate indices of refraction. Preferably the densities will be significantly different to facilitate rapid separation of the fluids when the housing is rotated. Once these design parameters have been chosen, the radius of the mandrel is selected to balance the least leakage of light when the core 20 is surrounded by the low index of refraction fluid and most leakage when the core is surrounded by the high index of refraction fluid. If the radius is chosen to be infinite (a straight line) very little light will escape the core, even when the core is surrounded by the high index of refraction fluid. If we select the radius to small, then all light will escape the core no matter how low the index of refraction of the low index of refraction fluid. From FIG. 3 the designer knows that the light ray 30 should be internally reflected when the core 20 is surrounded by the low index of refraction fluid. As a result the designer wants the radius to be at least as large as the radius necessary to have total internal reflection in this situation but not so large as to approach a straight line. Mathematically the light ray represented by line 30 is the shallowest angle $\beta$ at which light inside the core 20 can impinge upon the core-medium boundary 32. The angle $\beta$ is defined as the arcsin $[R/(R+D)]$, where R is the radius of the continuous arc (e.g., the radius of the mandrel 18) and D is the diameter of the core 20. From Snell's Law we know that the light ray 30 will be internally reflected as long as $n_1 \leq n_c^* \sin(\beta)$. Rearranging the equation $R \geq D[n_1/(n_1+n_c)]$.

Figure 4:
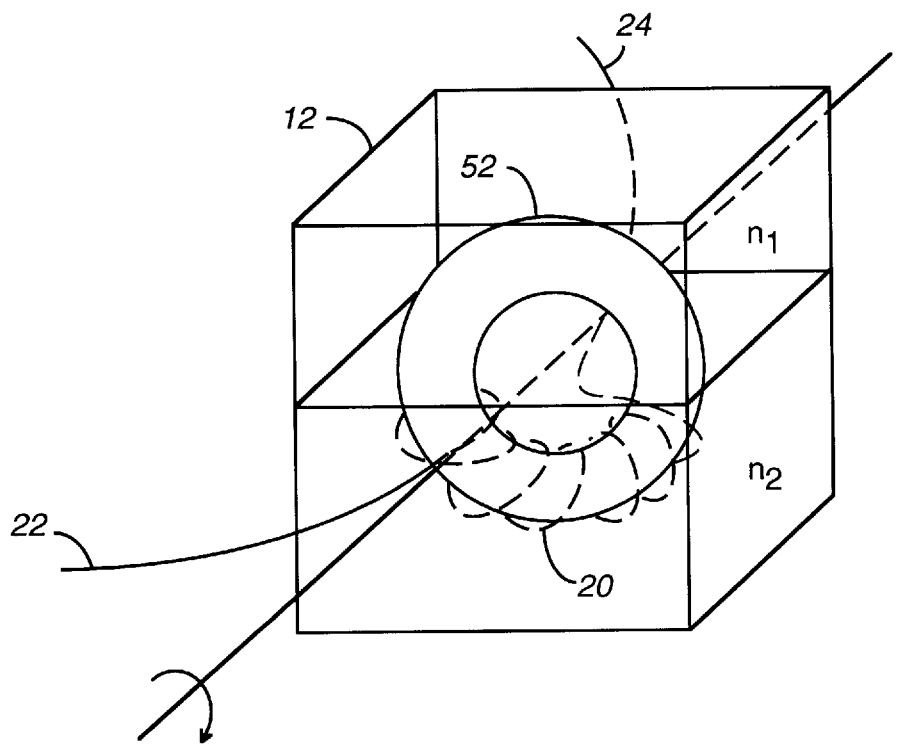
FIG. 4 is an embodiment of a fiber optic attenuator.

FIG. 4 shows a fiber optic attenuator (switch) 50. The fiber optic switch 50 operates on the same principle as the switch 10 of FIG. 1. The switch 50 differs in that the mandrel (bobbin) 52 is a toroid. This embodiment is the preferred design when the switch 50 is used as a attenuator. Many other variations and alternatives embodying the same principle will be obvious to those skilled in the art. All such variations and modification are considered part of the invention, as defined by the appended claims.

It should be noted that the switch 10 can be used as an attenuator as well as a switch. When the switch 10 is positioned so that the core 20 and mandrel 18 are partially covered by the first medium 14 and the second medium 16, the switch will allow a portion of the input light to pass through to the output 24.

Thus there has been described an optical switch and attenuator that is inexpensive, simple to construct, highly reliable and does not require sustaining power. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A fiber optic switch, comprising:
   a housing;
   an input capable of being connected to a fiber optic cable, the input attached to the housing;
   a single selectable waveguide, contained in the housing, having a first end and a second end, the first end connected to the input, the selectable waveguide having a first state and a second state wherein the single selectable waveguide comprises,
   a core of an optical fiber, the core being bent in a continuous arc; and
   a cladding having a first index of refraction when in the first state and a second index of refraction when in the second state; and
   an output connected to the second end of the selectable waveguide.

2. The fiber optic switch of claim 1, wherein the first state of the selectable waveguide transmits substantially all of an input light from the input to the output.

3. The fiber optic switch of claim 1, wherein the second state of the selectable waveguide attenuates substantially all of an input light.

4. The fiber optic switch of claim 1, wherein the cladding is a first medium in the first state and the cladding is a second medium in the second state.

5. A fiber-optic switch and attenuator, comprising;
   a sealed capsule;
   a first fluid contained in the sealed capsule having a first index of refraction and having a first density;
   a second fluid contained in the sealed capsule having a second index of refraction, the second index of refraction being greater than the first index of refraction, the second fluid having a second density, the second density not being equal to the first density;
   a bobbin within the sealed capsule; and
   a fiber optic core wrapped around the bobbin has a core index of refraction, the core index of refraction being less than the second index of refraction and greater than the first index of refraction, the fiber optic core having a first end and a second end outside the sealed capsule.

6. The fiber-optic switch and attenuator of claim 5, wherein the second fluid is not soluble in the first fluid.

7. The fiber-optic switch and attenuator of claim 5, further including means for transferring the fiber optic core from the first fluid to the second fluid and from the second fluid to the first fluid.

8. The fiber-optic switch and attenuator of claim 5, wherein the bobbin includes a groove and the fiber optic core sits in the groove.

9. The fiber-optic switch and attenuator of claim 5, wherein the bobbin is fixedly positioned in the sealed capsule.

10. The fiber-optic switch and attenuator of claim 5, wherein the bobbin has a radius that is a function of a diameter of the fiber optic core and the first index of refraction.

11. The fiber-optic switch and attenuator of claim 5, wherein the first fluid is not soluble in the second fluid.

12. A fiber-optic switch, comprising:
   a housing;
   a mandrel fixed inside the housing;
   a single waveguide core, inside the housing, having a predetermined index of refraction, the waveguide core wound around the mandrel and having a first end and a second end outside the housing;
   a first medium inside the housing having a first index of refraction and in contact with the single waveguide core in a first state; and a second medium in the housing has a second index of refraction and in contact with the single waveguide core in a second state.

13. The fiber-optic switch of claim 12, wherein the first index of refraction is less than the predetermined index of refraction.

14. The fiber-optic switch of claim 13, wherein the mandrel has a radius that is a function of a diameter of the fiber optic core and the first index of refraction.

15. The fiber-optic switch of claim 12, wherein the first medium has a first density that is not equal to a second density associated with the second medium.

16. The fiber-optic switch of claim 12, wherein the first medium is not soluble in the second medium and the second medium is not soluble in the first medium.

17. The fiber-optic switch of claim 12, further including a shaft attached to the housing.

18. The fiber-optic switch of claim 12, wherein the first index of refraction is not equal to the second index of refraction.

* * * * *